US006783176B2

(12) United States Patent
Ladson, III

(10) Patent No.: US 6,783,176 B2
(45) Date of Patent: Aug. 31, 2004

(54) BICYCLE SEAT

(76) Inventor: Norman N. Ladson, III, 2013 Kernan Dr., Gwynn Oak, MD (US) 21207

(*) Notice: Subject to any disclaimer, the term of this patent is extended or adjusted under 35 U.S.C. 154(b) by 0 days.

(21) Appl. No.: 10/058,824

(22) Filed: Jan. 29, 2002

(65) Prior Publication Data
US 2002/0117880 A1 Aug. 29, 2002

Related U.S. Application Data

(60) Provisional application No. 60/264,839, filed on Jan. 29, 2001.

(51) Int. Cl.$^7$ ................. B62J 1/00; B62J 1/18
(52) U.S. Cl. ................. 297/202; 297/214
(58) Field of Search ................. 297/202, 214

(56) References Cited

U.S. PATENT DOCUMENTS

| | | | | |
|---|---|---|---|---|
| 1,538,542 A | * | 5/1925 | Blake | 297/202 |
| 5,873,626 A | * | 2/1999 | Katz | 297/195.1 X |
| 6,152,524 A | * | 11/2000 | Cox | 297/201 |
| 6,193,309 B1 | * | 2/2001 | Gootter et al. | 297/202 X |

* cited by examiner

Primary Examiner—Anthony D. Barfield
(74) Attorney, Agent, or Firm—Law Offices of Royal W. Craig

(57) ABSTRACT

A bicycle seat that provides increased comfort during extended periods of use, due to a redistribution of the rider's weight. The primary components of the bicycle seat include a support shell/frame, a lightweight layer of padding, and a vinyl or plastic outer cover. A two-part front end section is designed to provide support for the upper, back portion of the rider's thighs. Allowing the thighs to bear part of the rider's weight, thereby reducing the amount left to be supported by the buttocks and groin area, is a novel aspect of the present invention. This front end section, combined with the angle of the seat's mounting on the bicycle's frame, is such that, when pedaling, the inside of the rider's thighs do not rub against the front end of the seat. The relatively broad tail section is designed to support the entire posterior of the rider in a manner that eliminates the rocking motion normally associated with the pedaling of the bicycle.

2 Claims, 6 Drawing Sheets

BICYCLE SEAT

CROSS-REFERENCE TO RELATED APPLICATIONS

The present application derives priority from U.S. Provisional Patent Application No. 60/264,839 for "BICYCLE SEAT DESIGN"; Filed: Jan. 29, 2001; Inventor: Norman N. Ladson, III.

BACKGROUND OF THE INVENTION

1. Field of the Invention

The present invention relates to the functionality and comfort of bicycle seats and, more specifically, to a bicycle seat design that increases comfort via a redistribution of the weight of the rider.

2. Description of the Background

The general configuration of bicycle seats has remained relatively unchanged for over one hundred years. While this traditional seat configuration, generally horizontal in profile with a narrow front end section (i.e. "the horn") and a wider, flared tail section with a concave intermediate section for thigh clearance, is universally recognized for its functionality with respect to the pedaling of the bicycle, it is a design that does not always provide a sufficient degree of comfort. The primary cause of discomfort is the pressure exerted on sensitive areas of the body (i.e. the sacral, coccal, ischial, and perineal/genital regions) when the weight of the rider rests on a traditional bicycle seat.

Efforts to increase the degree of comfort enjoyed by a rider during extended periods of bicycle usage have typically centered on the materials of construction. The materials of construction have evolved from the solid or perforated wood, cane, or similar rigid substances used in early bicycle seats to the multi-layer construction (e.g. a pliable or semi-rigid, molded, plastic or nylon shell over which is fitted a conforming layer of padding material and a leather, plastic, or vinyl cover) of modern, high performance seats.

Others have attempted to redress the defficiencies inherent in the traditional seat configuration by refining its contours (e.g. U.S. Pat. No. 5,011,222 to Yates et al.) or splitting it down the middle (e.g. U.S. Pat. No. 5,823,618 to Fox et al.). Occasionally, a new design represents a marked departure from the traditional configuration (e.g. U.S. Pat. No. 5,709,430 to Peters).

U.S. Pat. No. 5,011,222 discloses "an anatomically conforming bicycle seat having a compound surface including an elongated horn section transitioning rearwardly into a laterally flared, raised cantle." The horn section includes a perineum/genital groove that is symmetrically disposed along the longitudinal axis of its generally horizontal upper surface. The cantle possesses an angle of inclination of 45°±10° and includes "a pair of opposed, bilaterally symmetrical, inclined dished surfaces" and "a generally triangular, bilaterally symmetrical, raised, inclined coccyx support member disposed centrally and rearwardly" between the two dished surfaces. While this bicycle seat possesses a number of design elements that deviate from the traditional configuration, the weight distribution and, therefore, the long-term comfort of the rider remain largely the same.

U.S. Pat. No. 5,823,618 discloses "a pedestal seat having an adjustable base for supporting a first resilient suspension system for a pair of separate and spaced-apart cushioned body halves adapted for independent articulation with respect to each other." Each of the respective seat halves possess a second suspension system that is "adapted to bear against skeleton contact points of the rider's torso." Once again, this split seat design differs somewhat from the traditional configuration, however, the weight distribution and long-term comfort of the rider remain largely the same.

In U.S. Pat. No. 5,709,430, "an improved bicycle seat for relieving pressure to sensitive areas and transferring them to the sit bones of the rider" is disclosed. It is a seat design comprised of dual platforms with a plurality of adjustments. The adjustments allow the platforms to independently (1) slide forward or backward, (2) tilt forward or backward, (3) slide horizontally inward or outward, and (4) tilt inward or outward. While this radical design allows the weight of the rider to be borne by different elements of his/her anatomical structure, the total surface area of the seat is significantly reduced. If all other variables are held constant, the distribution of the weight of the rider over a smaller area results in greater pressures at the points of contact/support (i.e. the rider's "sit bones"). The question of whether the application of greater pressures to different parts of one's anatomy results in increased, or decreased, comfort during extended periods of use, is one better left to the interpretations of individual riders.

Therefore, there exists a need for a bicycle seat designed to address the issue of rider comfort during long-term usage via a redistribution of the weight of the rider.

SUMMARY OF THE INVENTION

It is, therefore, an object of the present invention to provide a bicycle seat design that does not cause rider discomfort during or after extended periods of use.

It is still another object to provide an improved configuration for distributing the weight of a rider seated on a bicycle over less sensitive areas of the rider's body.

In accordance with the above objects, one embodiment of an improved apparatus is a bicycle seat that possesses a divided front end section that extends several inches farther forward than the horn section of the traditional configuration, and a well-padded, relatively broad, tail section. To make complete use of its novel design, the present invention mounts on the bicycle frame such that the front end section tilts downward, from the horizontal, at an angle of 20°±10° with the tail section tilting correspondingly upward.

A brief description of the bicycle seat according to the present invention is as follows. The primary components of the seat assembly include the rigid support shell/frame that includes an attachment device for mounting the seat to the bicycle's frame, a lightweight layer of padding ranging in thickness from 2" in the front end section to 1½" at the tail section, and a vinyl, plastic or leather, non-slip outer cover.

The two-part front end section is designed to provide support for the upper, back portion of the rider's thighs. Allowing the thighs to bear part of the rider's weight, thereby reducing the amount left to be supported by the buttocks and groin area, is a novel aspect of the present invention's design. The design of the front end section, combined with the angle of the seat's mounting on the bicycle's frame, is such that, when pedaling, the inside of the rider's thighs do not rub against the front end of the seat (as happens with seats possessing the traditional configuration). The relatively broad tail section is designed to support the entire posterior of the rider in a manner that eliminates the rocking motion normally associated with the pedaling of the bicycle.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENT

Figure 1:
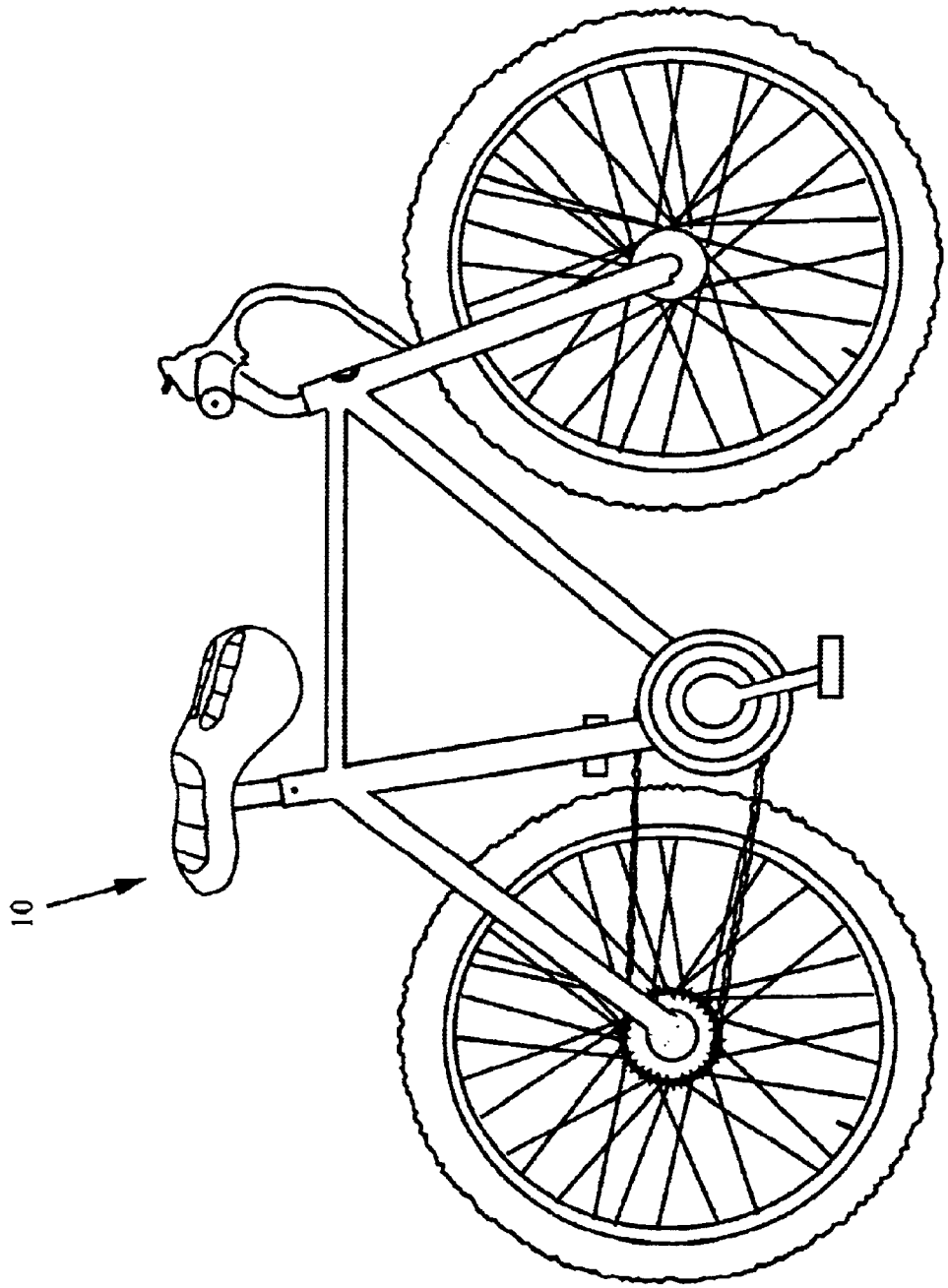
FIG. 1 is a side perspective view of a bicycle with seat 10 according to a first embodiment of the present invention.
Figure 2:
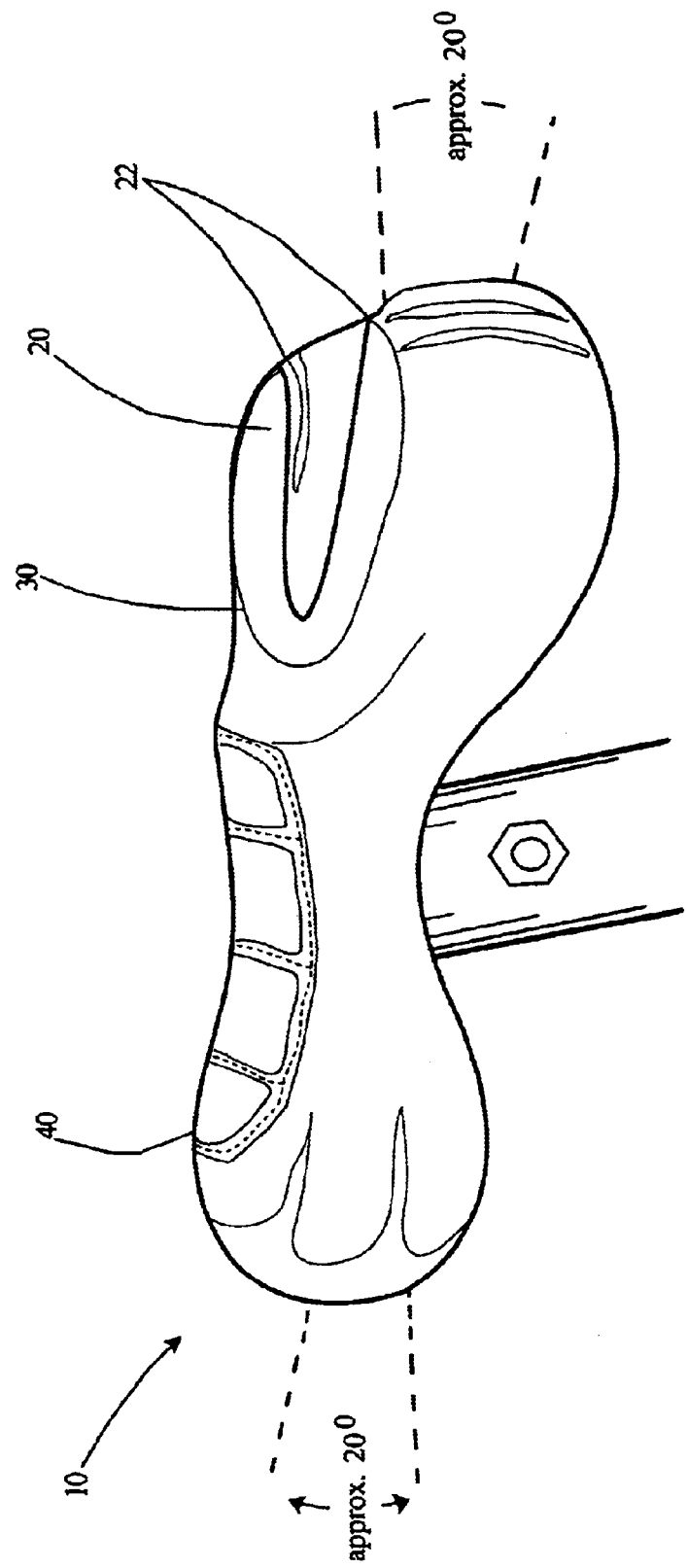
FIG. 2 is an enlarged side perspective view of bicycle seat 10 as in FIG. 1.
Figure 3:
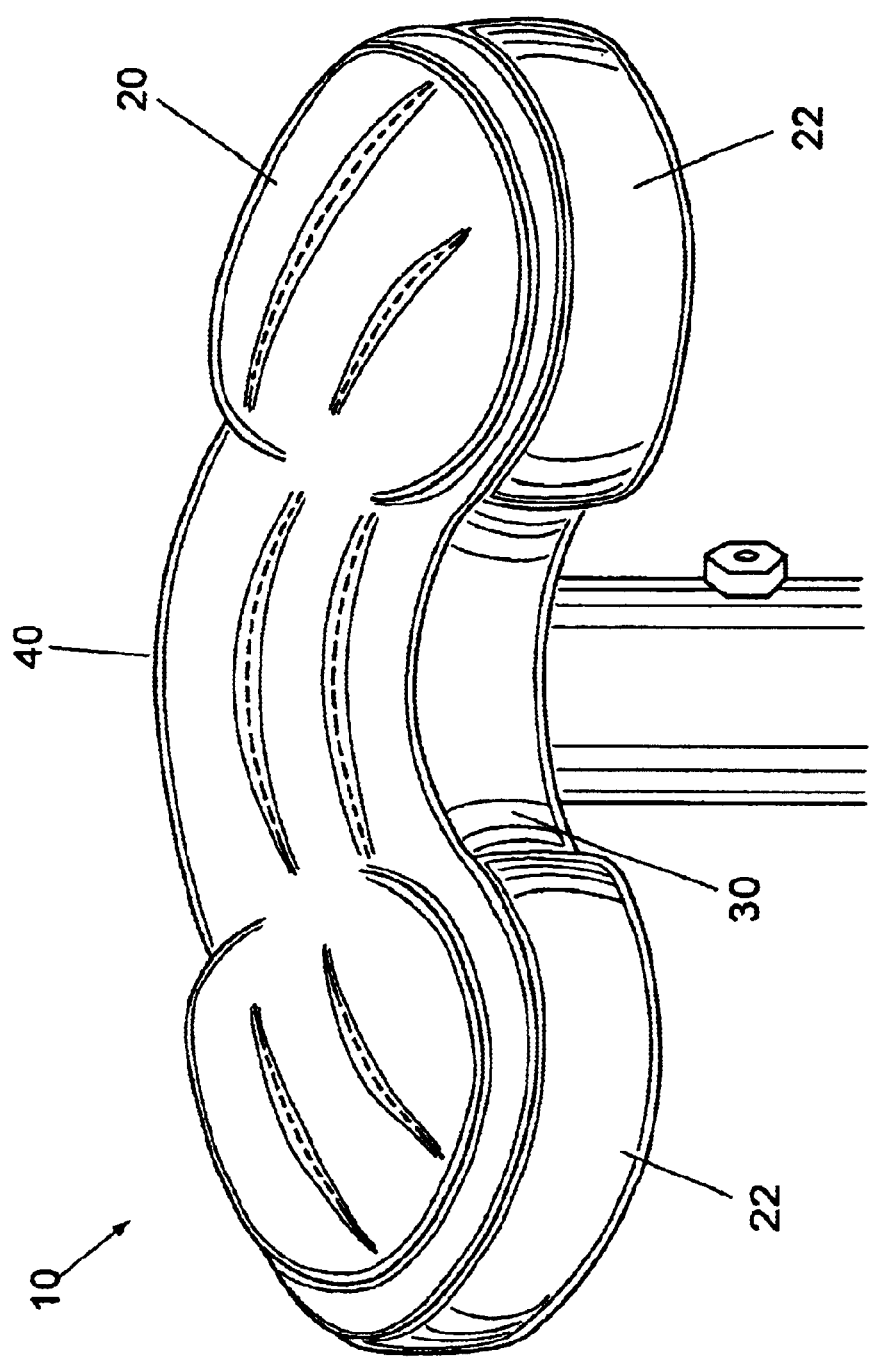
FIG. 3 is a front perspective view of bicycle seat 10 as in FIGS. 1–2.
Figure 4:
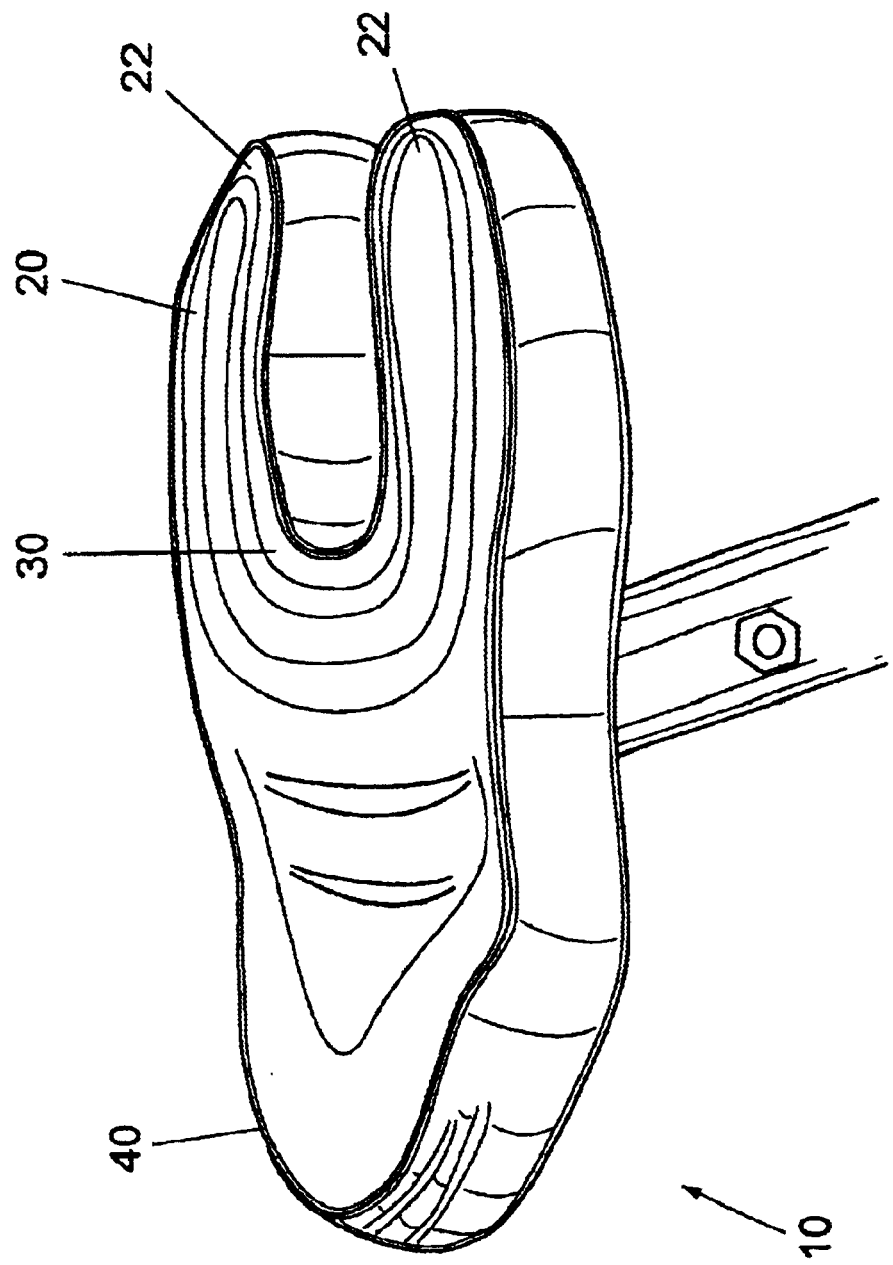
FIG. 4 is a downwardly angled view of the bicycle seat 10 of FIGS. 1–3.

FIG. 1 is a side perspective view of a bicycle with seat 10 according to a first embodiment of the present invention. Seat 10 provides increased comfort during extended periods of use, due to a redistribution of the rider's weight. A two-part front end provides support for the upper back portion of the rider's thighs, thereby reducing the amount left to be supported by the buttocks and groin area. This front end section, combined with the angle of the seat 10 mounted on the bicycle's frame, is such that, when pedaling, the inside of the rider's thighs do not rub against the front end of the seat FIGS. 2, 3, and 4 show, respectively, side perspective, front perspective, and downwardly angled views of the bicycle seat 10 as in FIG. 1. The three main areas of the bicycle seat 10 include a front end section 20, a transition area 30, and a tail section 40.

The front end section 20 is divided into two lobes 22 that extend several inches farther forward than the horn section of a traditional seat. Each of the lobes 22 is strategically positioned and padded to provide support and cushioning for the upper, back portion of the rider's thighs. The location and construction of the lobes 22, in conjunction with the tail section 40 discussed below, assist the rider in maintaining a stable, comfortable position at all times.

In the transition area 30 between the front and tail sections 20, 40, the center of the seat 10 curves inward and downward as the two lobes 22 begin to form. This creates a space where the rider's perineal/genital regions are positioned without experiencing any contact (e.g. pressure, pain) with the bicycle seat 10.

The tail section 40 is well-padded and relatively broad (as compared with bicycle seats of the traditional configuration). This section 40 supports the entire posterior of the rider in a manner that eliminates the rocking motion normally associated with the pedaling of a bicycle.

Figure 5:
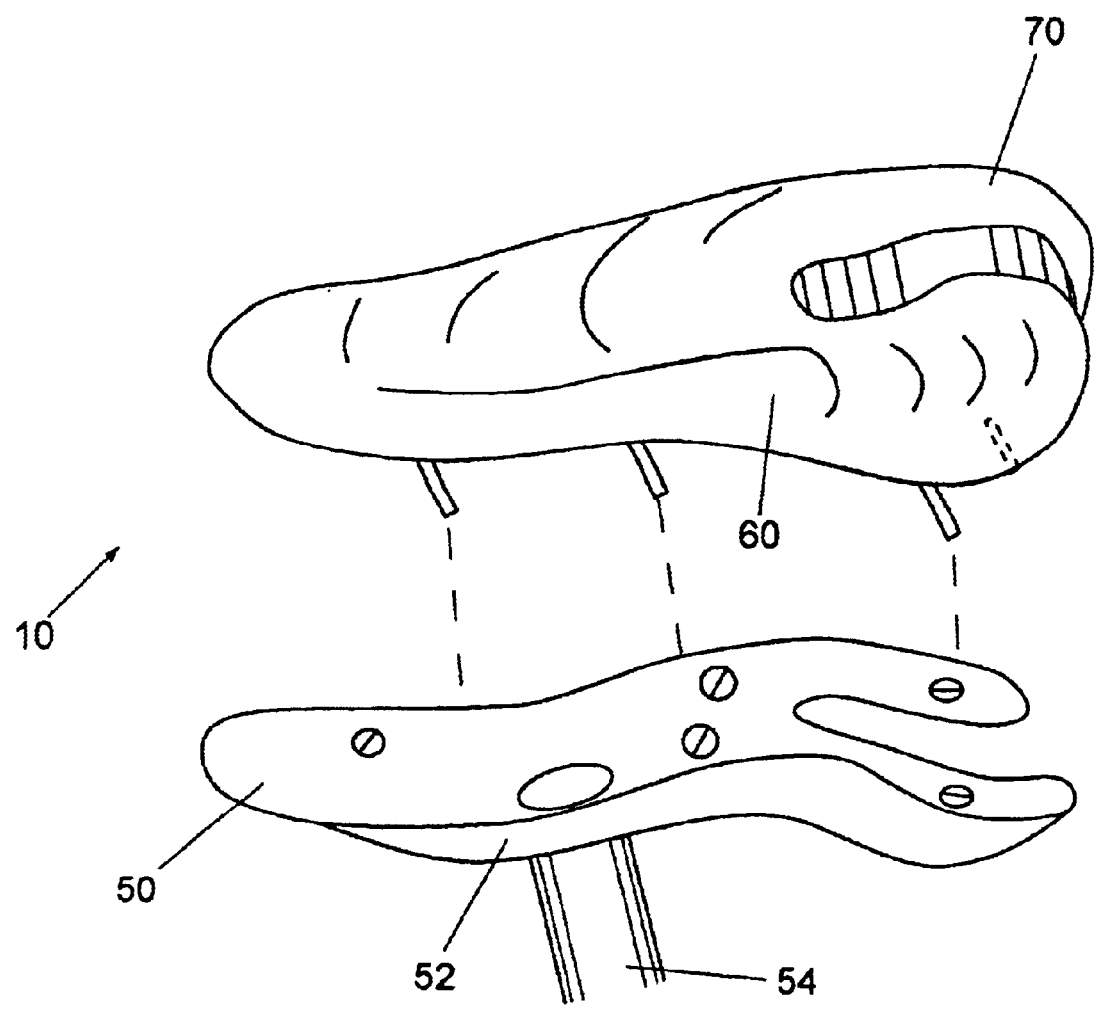
FIG. 5 is an exploded view of the bicycle seat padding 60 and the underlying support framework 50.

The primary components of the bicycle seat assembly 10 are seen in FIG. 5, which is an exploded view. The components include a rigid support shell/frame 50 that includes an attachment device 52 for mounting the seat 10 to the bicycle's frame 54, a lightweight layer of padding 60, and a vinyl or plastic outer cover 70 that holds the padding 60 on the shell/frame 50. The design of the attachment device 52 allows the seat 10 to be mounted on the bicycle frame 54 such that the front end section 20 tilts downward at an angle of 20°±10° and the tail section 40 tilts upward at a similar angle. In order to maximize rider comfort, the ultimate angle of the seat 10, with respect to the horizontal axis (i.e. the surface upon which the bicycle is ridden), is adjusted by the rider via a pivoting connection and locking mechanism within the attachment device 52.

Figure 6:
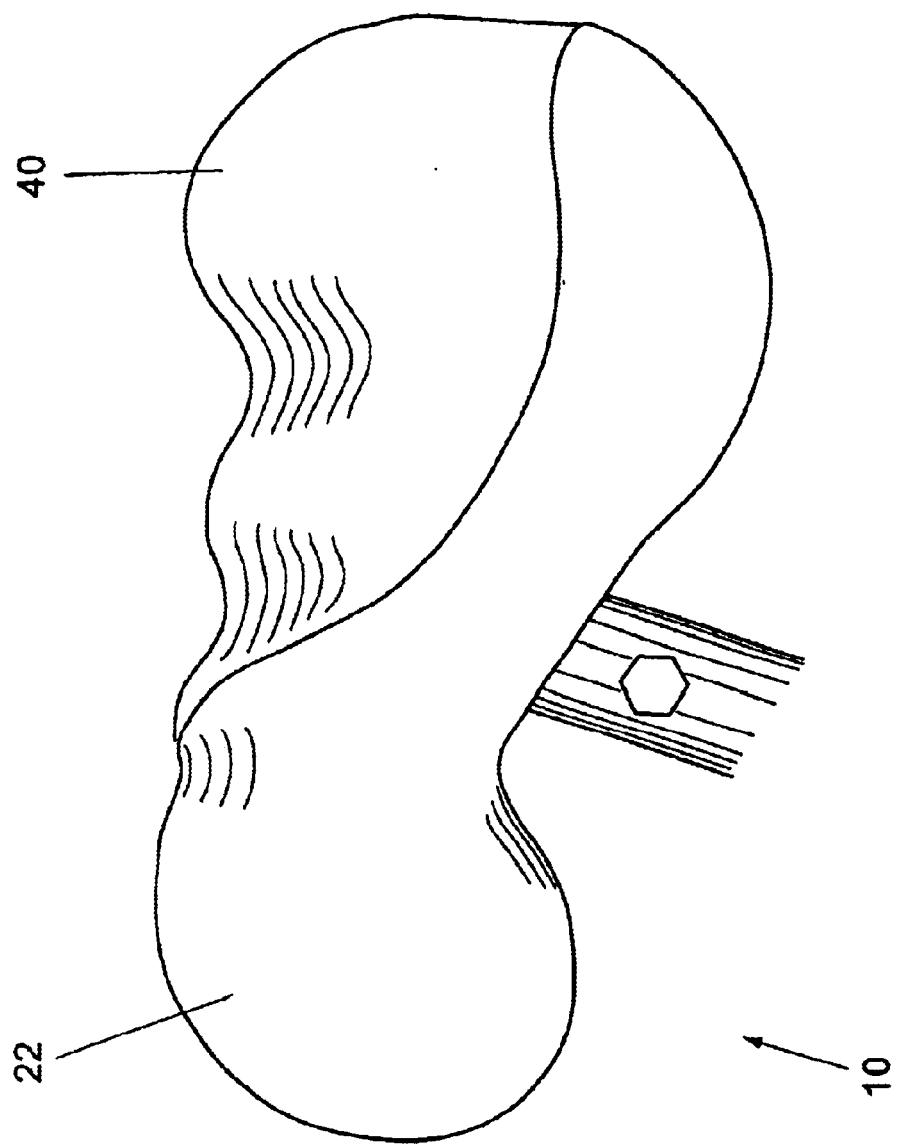
FIG. 6 is a cross-sectional view of the bicycle seat 10 of FIGS. 1–4.

FIG. 6 is a cross-sectional view that shows how the seat's layer of padding 60 ranges in thickness from 2" in the front end section's lobes 22 to 1½" in the tail section 40.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

I claim:

1. An anatomically compensating bicycle seat, comprising:

an attachment device for allowing said seat to be mounted on a standard bicycle frame;

a seat cushion mounted on said attachment device for seating of a rider, said seat cushion further comprising a continuous tail section integrally joined, by a transition area, to a divided front end section that includes two forwardly protruding lobes for supporting and cushioning an upper, back portion of said riders thighs, the transition area integrally joining said tail section and said front end section and curving inward and downward, for positioning said forwardly protruding lobes at an angle within a range of 20±10 degrees, and said forwardly protruding lobes supporting and cushioning an upper, back portion of said rider's thighs, allowing the thighs to bear a portion of the rider's weight, and thereby reducing the support needed for the rider's buttocks and groin;

wherein said seat cushion is mounted on said attachment device at a downward angle such that said front end section tilts downwardly from horizontal at an angle within a range of 20±10 degrees such that, when pedaling, the inside of the rider's thighs do not rub against the divided front end section of the seat and said continuous tail section tilts upwardly from horizontal and spans the entire posterior of the rider, thereby eliminating any rocking motion associated with pedaling of the bicycle;

said seat cushion further comprising a layer of padding overlying said continuous tail section, transition area and divided front end section, said padding being of gradiated thickness running from said continuous tail section to said divided front end section, for redistributing the rider's weight among the thighs, buttocks and groin, said layer of padding being thinner over said continuous tail section than over said divided front end section.

2. The anatomically compensating bicycle seat according to claim 1, wherein said layer of padding is approximately 1.5" thick over said continuous tail section and 2" thick over said divided front end section.

* * * * *